(12) United States Patent
Moore

(10) Patent No.: US 9,977,785 B2
(45) Date of Patent: May 22, 2018

(54) METHOD AND COMPUTER-READABLE MEDIUM FOR PRESENTING DISPLAYABLE CONTENT TO AN AUDIENCE

(71) Applicant: Legistek Corporation, Chicago, IL (US)

(72) Inventor: Peter N. Moore, Chicago, IL (US)

(73) Assignee: Legistek Corporation, Chicago, IL (US)

( * ) Notice: Subject to any disclaimer, the term of this patent is extended or adjusted under 35 U.S.C. 154(b) by 233 days.

(21) Appl. No.: 14/588,605

(22) Filed: Jan. 2, 2015

(65) Prior Publication Data

US 2015/0199164 A1    Jul. 16, 2015

Related U.S. Application Data

(60) Provisional application No. 61/923,367, filed on Jan. 3, 2014.

(51) Int. Cl.
*G06F 3/14* (2006.01)
*G06F 17/30* (2006.01)

(52) U.S. Cl.
CPC ...... *G06F 17/30056* (2013.01); *G06F 3/1454* (2013.01); *G06F 2203/04804* (2013.01); *G09G 2340/10* (2013.01); *G09G 2340/12* (2013.01); *G09G 2354/00* (2013.01)

(58) Field of Classification Search
CPC ......... G06F 3/044; G06F 21/55; G06F 9/5088
See application file for complete search history.

(56) References Cited

U.S. PATENT DOCUMENTS

| | | | |
|---|---|---|---|
| 9,141,332 B2* | 9/2015 | Coleman | G06F 21/55 |
| 2010/0131868 A1* | 5/2010 | Chawla | G06F 3/044 |
| | | | 715/759 |
| 2012/0319965 A1* | 12/2012 | Kurabayashi | G06F 9/5088 |
| | | | 345/173 |

OTHER PUBLICATIONS

LIT Software, TrialPad iPad App website listing—first publication date unknown but applicant knows all relevant content to have been published prior to Jan. 3, 2014 (3pgs).
Indata Corporation, TrialDirector 5 QuickStart Guide Nov. 2008, published in USA (40 pgs).
Indata Corporation, Introducing TrialDirector for iPad—publication date unknown but applicant knows all relevant content to have been published prior to Jan. 3, 2014 (2 pgs).
Indata Corporation, TrialDirector for iPad User Guide—Sep. 2012, published in USA (24 pgs).

* cited by examiner

*Primary Examiner* — Albert K Wong
(74) *Attorney, Agent, or Firm* — William F. Ward

(57) ABSTRACT

A user interface for a content presentation system is disclosed for displaying and manipulating graphical multimedia content for an audience while hiding operator-specific elements from the audience. The operator-specific elements are permitted to overlap the audience-viewable elements on the operator's display, allowing for optimal use of screen real estate particularly on smaller touch-based devices. The use of a multithreaded programming architecture is preferably employed to take advantage of multi-cored CPUs and GPUs, allowing the operator and audience displays to be governed by separate CPU cores or threads and therefore perform graphical manipulations with high efficiency.

8 Claims, 9 Drawing Sheets

FIG. 8
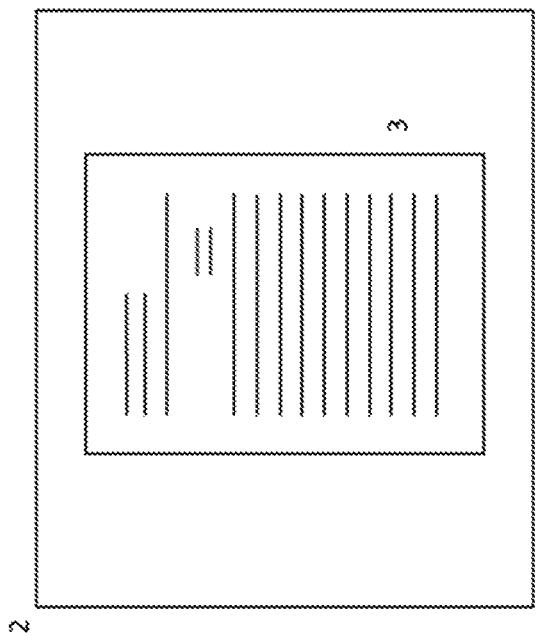
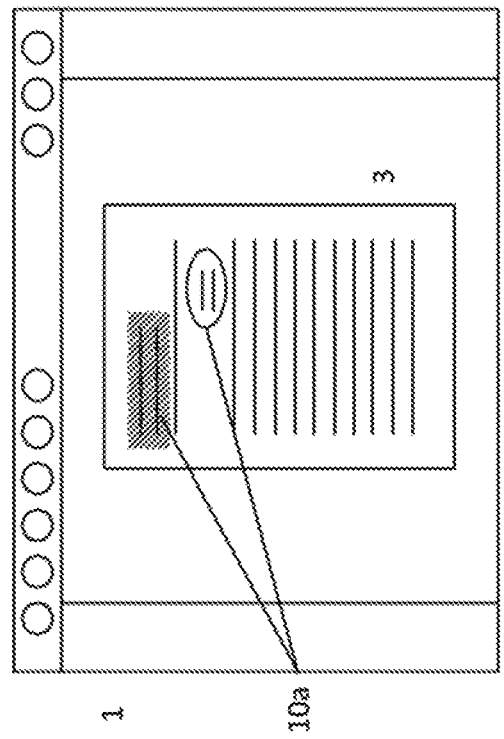

METHOD AND COMPUTER-READABLE MEDIUM FOR PRESENTING DISPLAYABLE CONTENT TO AN AUDIENCE

CROSS-REFERENCE TO RELATED APPLICATIONS

This application claims the benefit of provisional patent application No. 61/923,367, filed Jan. 3, 2014.

BACKGROUND OF THE INVENTION

Presenting documents and other displayable content to an audience in a compelling way has become an important part of public speaking. Software like Microsoft PowerPoint is now often an essential part of addressing groups of people in business or official contexts. An advantage of PowerPoint is that a presenter can advance the slideshow simply, even remotely, without detracting from the presentation by having to concentrate on operating a computer. PowerPoint is limited, however, in its relative inability to modify the way content is displayed during a presentation.

For presentations where more flexibility is needed, such as courtroom trials, specialized software like inData's Trial Director is available. This software allows manipulation or annotation of the displayed content in real time during the presentation. For example, an operator can pull up a different document, move to an arbitrary page of a document, move a document around on the screen, zoom in or out of a section of a document, callout a portion, highlight a portion, circle a portion, and the like, all in real time.

The drawback of software like Trial Director is that it is not necessarily conducive to operation by the speaker or presenter. Usually, presenters, such as questioning attorneys, require another person sitting behind the scenes to operate the software in response to verbal cues. While it is possible for the presenter to use the software on a laptop at a podium, such software is designed for use with a mouse and keyboard, which can be awkward and distracting to try to use during a live presentation, and usually makes inefficient use of screen real estate on the assumption that a live operator is set up behind a desk with a generously sized computer screen. Another disadvantage to some prior art is that content intended only for the operator, such as a file picker, remain visible to the audience, detracting from a seamless and professional-appearing presentation.

Recently, software has become available to try to provide some of the functionality of applications like Trial Director on a tablet PC, intended to be used by the presenter rather than with the assistance of a separate operator. These programs include LitSoftware's TrialPad and inData's TDMobile, both of which operate on the Apple iPad. These applications allow manipulation of the displayable content in response to multitouch gestures by the operator; for example, "pinch to zoom." Moreover, they generally hide operator-specific content, such as file pickers, from the audience, displaying such content only on the operator's tablet. However, these applications can still be difficult or awkward for a presenter to navigate in real time on a small tablet-sized screen, principally because the operator-specific content either blocks the displayable content from the presenter and prevents the latter's manipulation, or forces the displayable content area of the operator's display to shrink to accommodate the new elements, wasting valuable screen real estate. Any additional content the operator may wish to have visible on the display, such as notes about the displayed document, would take up even more screen space, as can be seen in Microsoft PowerPoint's "Presenter View."

BRIEF SUMMARY OF THE INVENTION

A goal of the present invention, therefore, is to provide a superior user interface for a multimedia content presenter, especially for tablets and smaller screens, which makes optimal use of screen real estate without sacrificing usability. The invention includes displaying operator-specific content on the operator's display that is not visible on the secondary display seen by the audience. Important aspects of the invention are that the operator-specific content can overlap with the area of the operator's display containing the displayable content, and moreover can do so without preventing manipulation of the displayable content. These allow for a number of features not possible in prior art applications, which will be described in further detail herein.

BRIEF DESCRIPTION OF THE SEVERAL VIEWS OF THE DRAWING

Hereinafter the present invention will be explained by way of example with reference to the attached drawings. Therein are shown:

FIG. 8 depicts a preferred embodiment in which the operator-specific content includes annotations to the displayable content that are invisible to the audience.

DETAILED DESCRIPTION OF THE INVENTION

The process of displaying operator-specific content that overlaps with the displayable content without preventing manipulation thereof will now be described. In the preferred embodiment, the application runs on the Microsoft Windows 8.1 "Windows Store" app platform, which is also very similar to the Microsoft Windows Presentation Foundation (WPF) platform. A primary processing thread handles the operator display and responds to user commands and manipulations including multitouch gestures. A secondary processing thread handles the secondary display that is seen by the audience. Both threads contain and enable a Stage control which contains a Canvas control for adding multimedia content, including images, videos, shapes, text boxes, and the like, anywhere on the x/y plane and at any z position.

Figure 1:
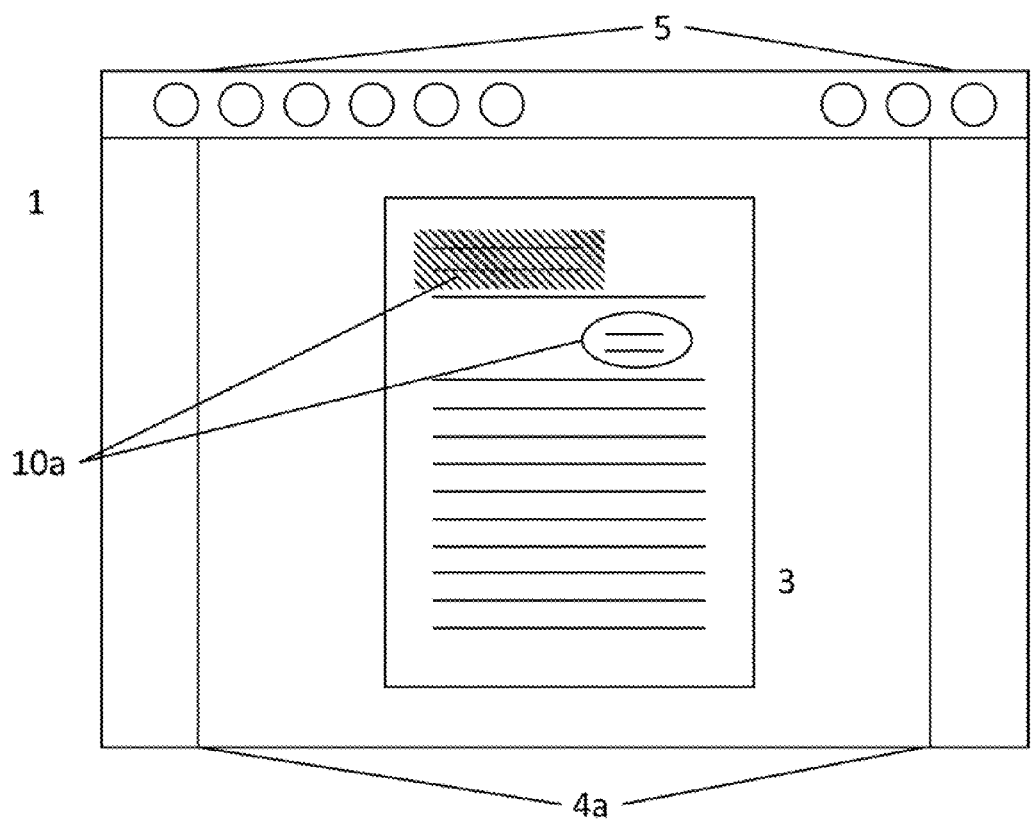
FIG. 1 depicts a preferred embodiment of an operator display according to the invention.
Figure 2:
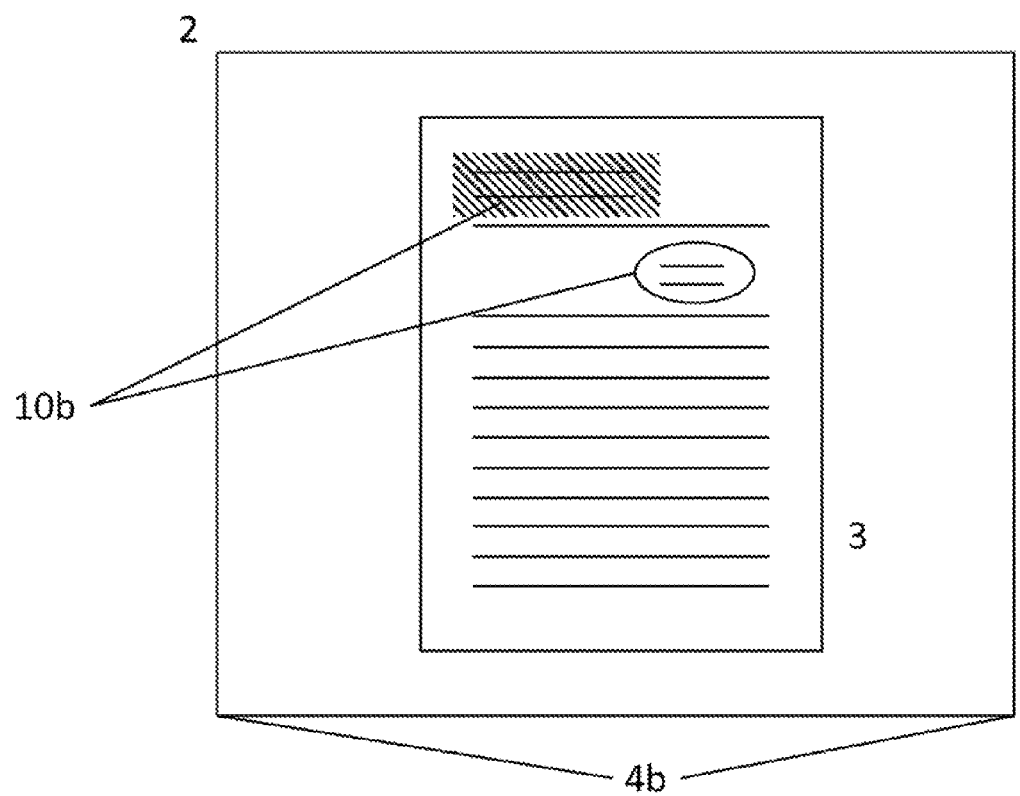
FIG. 2 depicts a preferred embodiment of an audience display according to the invention.
Figure 9:
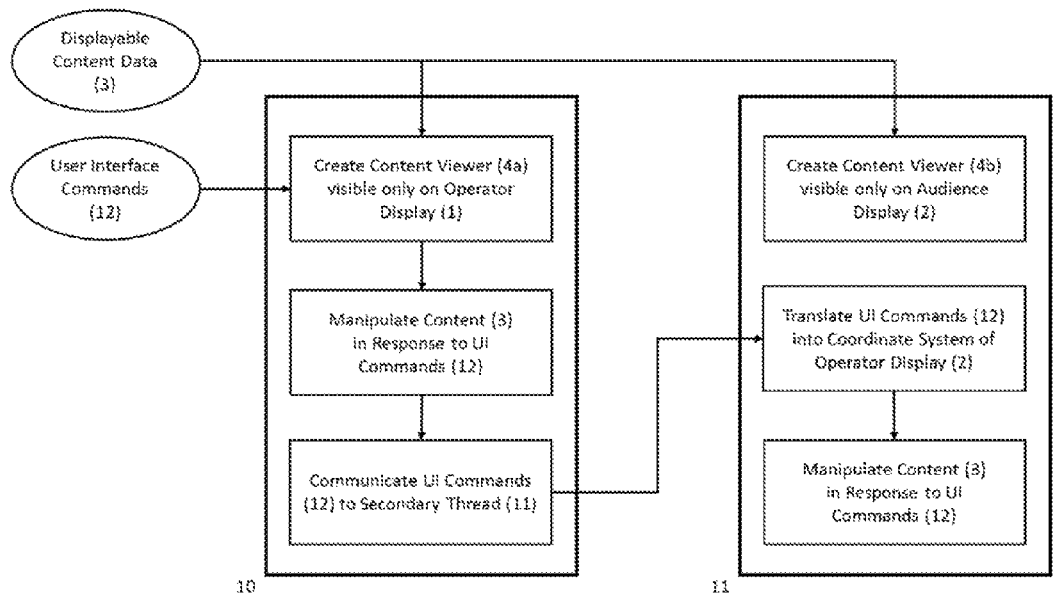
FIG. 9 depicts a preferred embodiment in which the operator display and the audience display are managed by separate processing threads.

Turning to FIGS. 1 and 2, as further detailed in FIG. 9, when content, such as a document (3), is first selected by the operator for display on an operator display (1), a Windows user control, referred to herein for convenience as a Content Viewer (4a), (4b), is added to the Stages of both the prima (10) and secondary threads (11) and made visible on the operator display (1) and audience display (2), respectively. The Content Viewer objects (4a), (4b) are both linked to the same data containing the displayable multimedia content (3) and are capable of displaying that content using an appropriate Windows control and/or API. For example, a page of a document (3) can be represented by an Image object sourced by a BitmapImage object containing a TIFF image. The two Content Viewer controls (4a), (4b) are also linked to one another programmatically, and are aware of which is in the primary thread (operator's display) (1) and which is in the secondary thread (audience's display) (2).

With regard to displayable content—content intended to be seen by the audience—the two Content Viewer controls (4a), (4b) are intended generally to be mirror images; however, in the preferred embodiment only the Content Viewer (4a) in the primary thread (10) is enabled to respond to user interface commands (12) such as multitouch gestures. When handling such a command (12), the Content Viewer (4a) is responsible for manipulating the content on the operator's display (1) and for communicating the essential information about the manipulation to the Content Viewer control (4b) in the secondary thread (11). Myriad kinds of manipulations are possible, but the most common types used in typical applications include pan, zoom, highlight, callout, and draw, which are known in the art Examples of such annotations (10a), (10b) on the presenter and audience displays, respectively, are seen in FIGS. 1 and 2. Whatever commands are executed, once communicated to the secondary thread (11) the Content Viewer (4b) in that thread then executes the same command(s) (12) in order to maintain the mirror image relationship between the two viewers (4a), (4b). Furthermore, if the operator's display (1) and audience display (2) are at different screen resolutions or aspect ratios, the software scales the manipulations into the correct coordinate system so that both the audience and operator see substantially the same image. Note that, as is true of the prior art, the operator display (1) contains additional user interface elements (5), such as icons, which are not themselves content but assist the operator in manipulating the displayable content (3) or adding to it.

Figure 3:
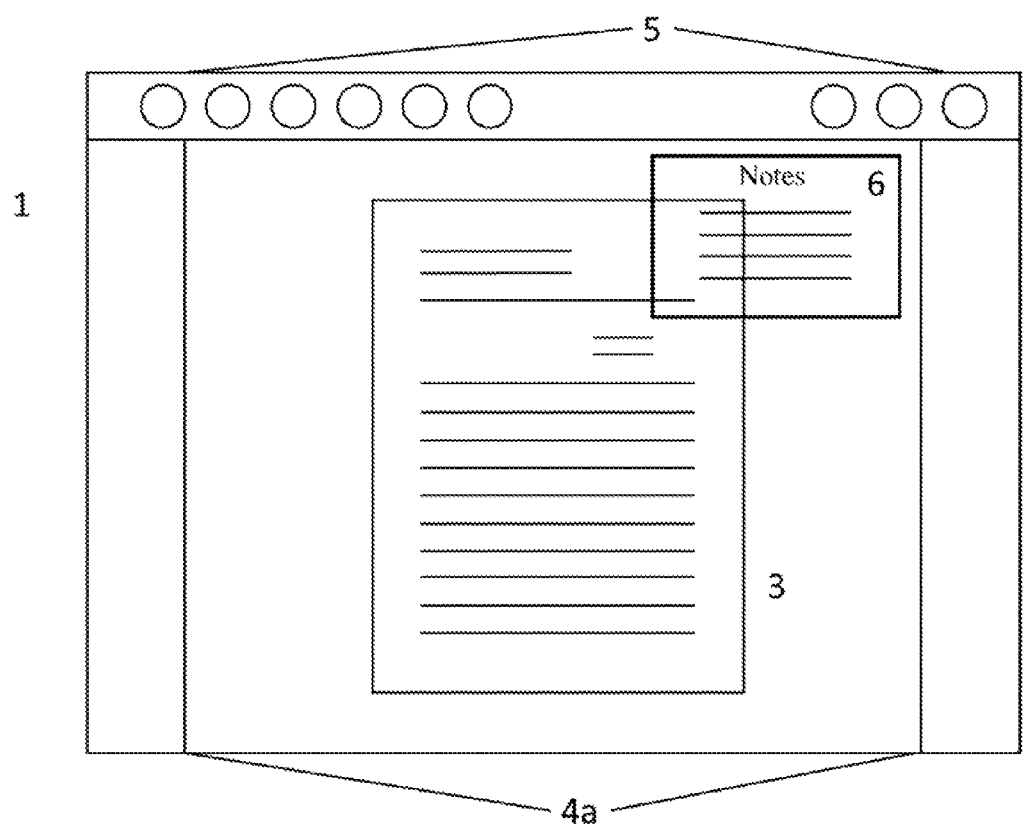
FIG. 3 depicts a preferred embodiment of an operator display according to the invention which includes operator-specific content not displayed to the audience.
Figure 4:
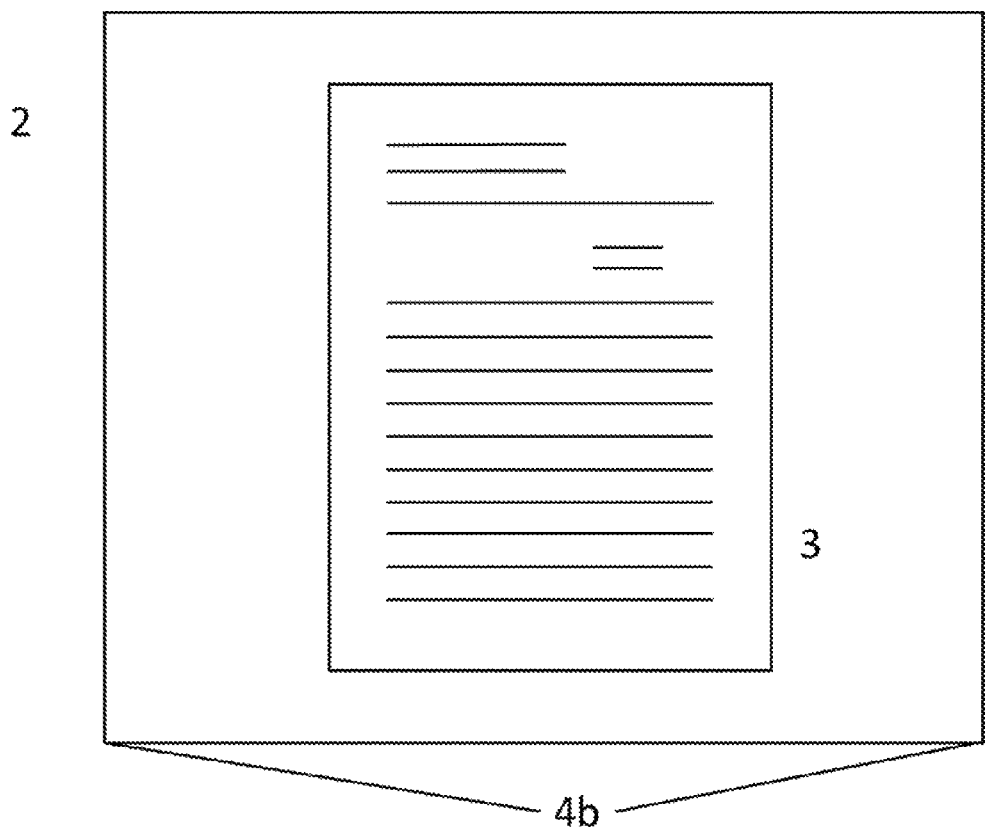
FIG. 4 depicts a preferred embodiment of an audience display according to the invention demonstrating that the operator-specific content from FIG. 3 is not displayed.

A document may also contain operator-specific content, which is not intended to be seen by the audience, and a novel aspect of this invention is allowing such content to be displayed to the operator over the audience-displayable content without being seen by the audience. Turning to FIGS. 3 and 4, depicting the operator's display (1) and audience display (2), respectively, the operator may wish to annotate the document (1) with his own notes (6), which he would do in advance of the presentation, and would wish to see the annotations during the presentation, but not allow the audience to see them. In a preferred embodiment, this is accomplished programmatically by adding a TextBox containing the operator's notes (6) to the Content Viewer (4a) in the primary thread (10), placing it on top of the Image representing the displayed (audience-viewable) content, at the desired location, and providing it a semi-transparent background. The TextBox is not added to the Content Viewer (4b) in the secondary thread (11), however (or if it is added it is set to "Collapsed" via the Visibility property, as is well known to those skilled in Windows-based UI development). The TextBox is visible to the operator, though, including when manipulating the document (3), moving and zooming in unison with the underlying document. In this embodiment, the operating system and underlying hardware are responsible for maintaining the visibility of the operator's notes (6) on the operator's display (1), even as the Content Viewer (4a) is further manipulated, while displaying no operator notes on the audience's display (2). Notably, the text (6) is even editable during the course of the presentation; as the TextBox is hidden or does not exist on the Content Viewer (4b) dedicated to the audience's display (2), the audience does not see a cursor or other indicia of text being edited, let alone the text itself.

Figure 5:
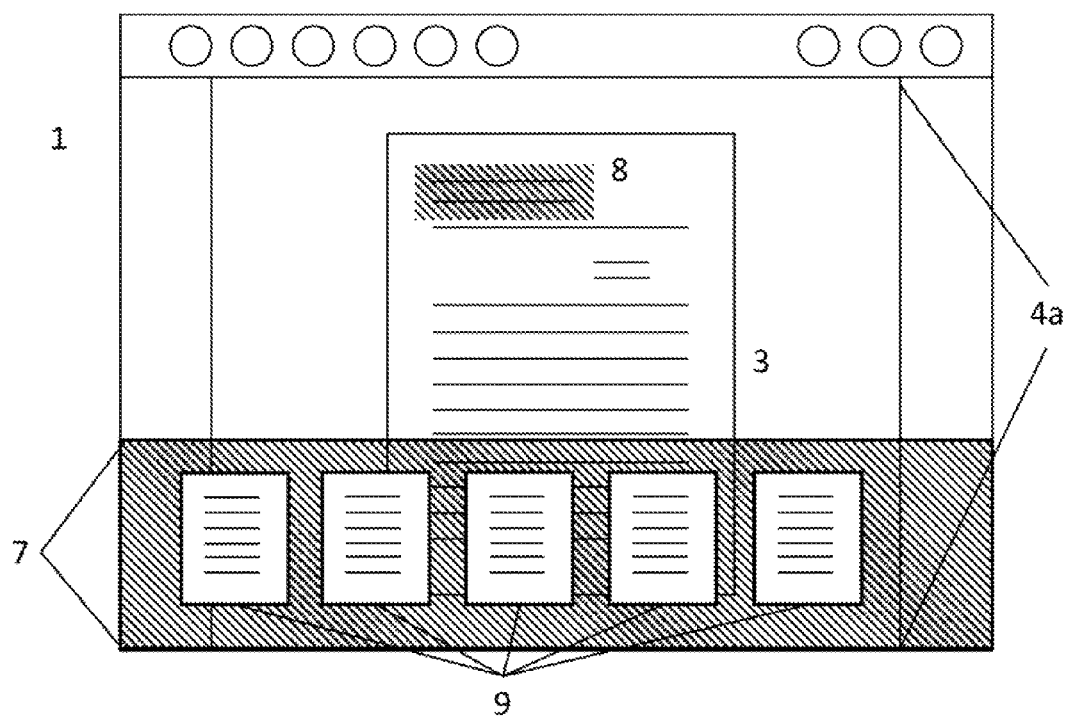
FIG. 5 depicts a preferred embodiment of an operator display according to the invention which includes operator-specific content consisting of a graphical file picker which is not displayed to the audience.

Further examples of operator-specific content, the display of which is facilitated by the foregoing invention, will now be described. In one example, seen in FIG. 5, the operator specific content includes a graphical file picker (7) displaying thumbnail images (9) of other documents, or pages therein, in the operator's presentation file so that they can be quickly and randomly accessed at any time. As with other operator specific content, the file picker (7) is invisible to the audience, and can overlap with the audience-displayable content. Again, a semi-transparent background is preferable for this purpose to avoid completely blocking audience-viewable content on the operator's display. Further, manipulation of the displayable content remains enabled while the file picker (7) is open. That is, the operator need not close the file picker (7) to continue manipulating the document. This example is seen in the figure, where the operator has added a highlight (8) with the file picker open. Note the corresponding audience display (not depicted) will show no file browser, but will show the highlight (8).

Figure 6:
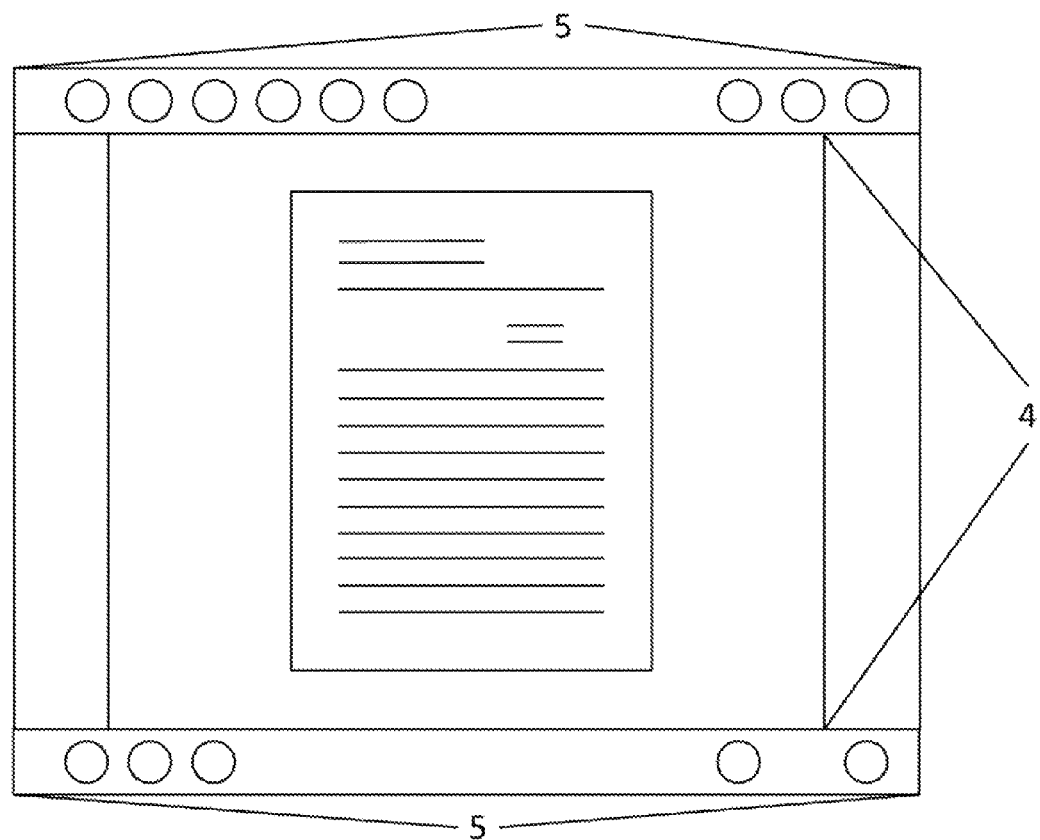
FIG. 6 depicts a prior art operator display comprising a content viewer and various user interface elements.
Figure 7:
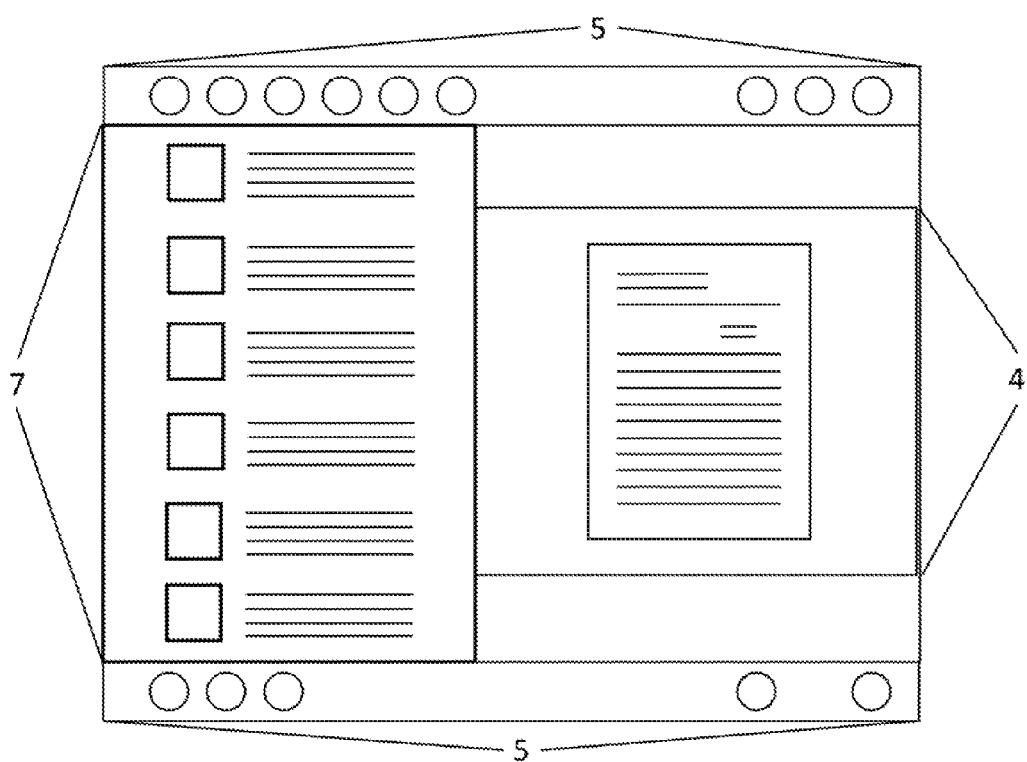
FIG. 7 depicts a prior art operator display comprising the same elements as FIG. 6 along with a graphical file picker that displaces the content viewer and does not overlap with it.

The preferred file picker (7), since it is not displacing the displayable content (4a), is thus larger than in most prior art applications, and includes page thumbnails (9) that can be dragged and dropped directly onto the displayable area (4a), thereby selecting a new page. This superior use of screen real estate is possible because the operator specific content (7), (9) has been permitted to overlap onto the displayable content (4a) on the operator's display (1), but remains hidden from the audience. This represents a significant advantage over prior art applications whereby operator content like the file picker cannot be displayed without shrinking the Content Viewer (4), as seen in FIG. 6 (normal mode) and FIG. 7 (file picker open), based on a prior art content presenter. As seen in FIG. 7, the Content Viewer (4) is significantly shrunk, displaced by the file picker (7).

In another example of operator-specific content, as shown in FIG. 8, an operator may wish to add complex annotations (10a) to his own copy of a document (3), such as highlights and drawing markups (10a), in advance of the presentation, which he does not wish the audience to see, or wishes to add one by one during the presentation. Particularly with a dense document, an operator would not wish to waste valuable presentation time searching for the area of the document to highlight to the audience. Traditionally, the presenter would keep a marked up copy of the document as part of a paper outline, and would display a clean copy on a projector, using his marked up copy or other notes to refresh his recollection about the contents of the document and to recreate the annotations he wishes the audience to see as he wishes them to see them. Using the present invention, however, an operator can create operator-specific annotation content (10a) in advance, such as highlights or drawings, which overlap the displayable content (3) but are not seen on the audience display (2). In one preferred embodiment, the operator specific markups (10*a*) gently oscillate between visible and invisible in order to flag to the operator that the content is visible only to him. The operator can then optionally convert each such markup to be visible to the audience, one by one or all at once, using a multitouch gesture such as a double tap. This would greatly reduce, if not eliminate, the need for the presenter to maintain a cumbersome hard copy file at the podium The disclosed method of maintaining two live "stages" on different processing threads, a further depicted in FIG. 9, each dedicated to one of the two displays, though it is but one of many possible implementations of this invention, is particularly advantageous as it exploits multi-cored processors and hardware graphics acceleration present in higher end tablets and computers. This facilitates selectively showing content on the operator display (1) but not the audience display (2) regardless of overlap, while mirroring the portions that should be displayed on both. Hardware graphics accelerators, rather than the CPU, are thus left free to perform the graphical manipulations on both displays, allowing for more complex graphics and animations than seen in the prior art. For example, pre-programmed animations such as fades or motion can be cloned on both displays, occurring in real time, by initiating them on both the primary (10) and secondary (11) threads in quick succession. Such hardware, well suited to multiple overlapping images such as is seen in video games, can efficiently display both the displayable content and operator-specific content on the respective displays regardless of the degrees of overlap, translucency, etc. of other elements.

Furthermore, leaving the user-interface thread (10), which executes the operator's commands and maintains the operator's display, free of the burden of also maintaining the audience's display (2) vastly improves the efficiency and responsiveness of the operator's user interface and reduces the lag between the operator display (1) and audience display (2) that is seen in some prior art applications. A manipulation being performed in real time on the operator display (1) (such as a pan or zoom) will appear on the audience display virtually exactly in sync, since the two processing threads (10, 11) are both responding to the same commands (12) in parallel. This further facilitates efficient transmittal of graphical information from the operator's computer (typically a tablet PC) to the secondary display, which may be connected to the operator's computer wirelessly such as through the "Miracast" protocol, again reducing potential lag between what is seen on the operator's display (10) and the audience display (2).

Of course, it should be appreciated that the aforementioned examples are purely illustrative and are not intended to be limiting of the claimed invention.

I claim:

1. A non-transitory computer readable medium containing program instructions for causing a computer to perform the method of:
    accessing data representing displayable multimedia content for presentation to an audience;
    displaying a representation of a first subset of said displayable multimedia content in an application window on an operator display;
    displaying said representation of said first subset of said displayable multimedia content in an application window on a secondary display;
    displaying a representation of a second subset of said displayable multimedia content in said application window on said operator display in front of said representation of said first subset such that said representation of said second subset overlaps at least a portion of said representation of said first subset on said operator display,
        wherein said representation of said second subset is not visible on the secondary display, and
        wherein said representation of said first subset on said secondary display remains unobscured; and
    manipulating in response to operator input said representation of said first subset on both the operator display and the secondary display, wherein said representation of said second subset remains visible on said operator display in front of said representation of said first subset during said manipulation.

2. A non-transitory computer readable medium containing program instructions for causing a computer to perform the method of:
    in a first and second processing threads executing within a single process, accessing a collection of displayable multimedia content for presentation to an audience;
    in said first processing thread, displaying a representation of a first subset of said displayable multimedia content in an application window on an operator display;
    in said second processing thread, displaying said representation of said first subset of said displayable multimedia content in an application window on a secondary display;
    in said first processing thread, responding to a first user interaction by manipulating the appearance of said representation of said first subset on said operator display, and
    communicating information about said first user interaction to said second processing thread;
    in said second processing thread, manipulating the appearance of said representation of said first subset on said secondary display to substantially match the appearance of said representation of said first subset on said operator display; and
    in said first processing thread, responding to a second user interaction by displaying a representation of a second subset of said displayable multimedia content on said operator display;
    wherein said representation of said second subset is not visible on the secondary display, and
    wherein said representation of said first subset on said secondary display remains unobscured when the representation of said second subset overlaps the representation of said first subset on said primary display.

3. The non-transitory computer readable medium of claim 1,
    wherein the operator display and the secondary display operate at different screen resolutions, and
    wherein user input directed to the representation of said first subset on the operator display is scaled to the resolution of the secondary display prior to being used to manipulate the representation of said first subset on the secondary display.

4. The non-transitory computer readable medium of claim 1, wherein the operator display contains user interface elements for manipulating said representation of said first subset.

5. The non-transitory computer readable medium of claim 1, wherein the operator display contains user interface elements for adding annotations to said representation of said first subset.

6. The non-transitory computer readable medium of claim 5, wherein said annotations are visible on the operator display and invisible on the secondary display.

7. The non-transitory computer readable medium of claim 1, wherein the operator input comprises a multitouch gesture directed to the operator display.

8. The non-transitory computer readable medium of claim 1, wherein said representation of said second subset is part of a selector for choosing the contents of said first subset, wherein said selector is visible on said operator display and invisible on said secondary display.

* * * * *